United States Patent [19]
Iwai et al.

[11] Patent Number: 5,786,933
[45] Date of Patent: Jul. 28, 1998

[54] REAR PROJECTOR CABINET

[75] Inventors: Yuji Iwai, Kanagawa; Ryoji Naito, Tokyo; Masataka Onishi, Tokyo; Takayasu Ishikawa, Tokyo, all of Japan

[73] Assignee: Sony Corporation, Tokyo, Japan

[21] Appl. No.: 666,596

[22] Filed: Jun. 18, 1996

[30] Foreign Application Priority Data

Jun. 19, 1995 [JP] Japan .................... 7-151356

[51] Int. Cl.$^6$ ............................... G03B 21/28
[52] U.S. Cl. ............................ 359/460; 348/836
[58] Field of Search ..................... 359/443, 460; 353/47, 74, 77, 119; 348/836, 843

[56] References Cited

U.S. PATENT DOCUMENTS 3,804,504  4/1974  Scott ............................ 353/77
5,580,146  12/1996  Maslow ......................... 353/74

*Primary Examiner*—Daniel P. Malley
*Attorney, Agent, or Firm*—Jay H. Maioli

[57] ABSTRACT

A rear project cabinet for arear projection television set in which the screen and the mirror can be easily set in their positions and an optical accuracy can be established. The screen fixing segment and the mirror fixing segment constituting the rear projector cabinet are formed by plastic material in such a manner that each of its depth size and the inclination angle of the mirror may become a set value, thereby a well-focused appropriate screen can be attained by a mere coupling and assembling of these segments, and even in the case that the screen size at the screen fixing segment is different, it can be accommodated by applying a proper insert die during molding of the mirror fixing segment.

3 Claims, 5 Drawing Sheets

5,786,933

1

REAR PROJECTOR CABINET

BACKGROUND OF THE INVENTION

1. Field of the Invention

This invention relates to a rear projector cabinet which is constructed such that visual devices are installed inside a bottom cabinet and both a screen fixing segment and a mirror fixing segment are fixed above the bottom cabinet.

2. Description of Related Art

As this type of prior art rear projector, the projectors having configurations shown in FIGS. 9 and 10, for example, are well known in the prior art. The rear projector 1 shown in FIG. 9 is made of wooden panels, wherein the projector is constructed such that the panels are formed into a box-like shape to construct a main body 2, a screen fixing segment 4 having a screen 3 fixed thereto is fixed to the front surface of the main body and concurrently a mirror fixing segment 6 provided with a mirror 5 is fixed to the rear surface of the main body, and further a bottom cabinet 7 provided with visual devices for projecting images and electronic parts and the like is installed below the main body 2.

In addition, the rear projector 1 shown in FIG. 10 has a configuration in which a metallic frame 8 having a predetermined shape is formed at the bottom cabinet 7 while being raised upwardly, the screen fixing segment 4 having the screen 3 and the mirror fixing segment 6 having the mirror 5 are fixed in such a way the frame 8 is held at its front side and rear side between both segments.

The prior art in relation to FIG. 10 has a configuration in which each of the screen fixing segment 4 and the mirror fixing segment 6 is fixed separately at the wooden main body 2 at its front side and rear side, respectively, and this configuration has problems that a severe accuracy in size of the main body 2 is required when the wooden panel is cut during its manufacturing process to keep an optical accuracy in operation, not only its manufacturing efficiency is deteriorated, but also a predetermined strength must be maintained at the main body 2 of the wooden cabinet, resulting in the panel thickness being automatically increased thereby causing its entire weight to be heavy.

Although the prior art in relation to FIG. 10 can keep a strength of the cabinet and an optical accuracy by applying the metallic frame 8, this prior art has problems that not only its entire weight is increased in correspondence with the application of the metallic frame 8, but also the number of component elements is increased, and similarly not only parts monitoring work becomes complicated, but also assembling workability is deteriorated.

Accordingly, the aforesaid prior art has a problem to be solved in improving an optical accuracy while simplifying the configuration.

SUMMARY OF THE INVENTION

As a practical configuration for solving the aforesaid prior art problems, the present invention provides a rear projector cabinet comprised of a bottom cabinet having at least such a predetermined shape and a predetermined size as one for installing visual devices; a screen fixing segment with a screen fixed thereto at the front surface of the cabinet; and a mirror fixing segment having a mirror fixed while being inclined at an inner side of the rear surface characterized in that the rear surface side of the screen fixing segment and the front surface side of the mirror fixing segment are combined to each other, assembled on the bottom cabinet, and the

2 screen fixing segment and the mirror fixing segment are formed by plastic material with an injection molding means in such a manner that a depth size of the assembled segments after being assembled may become a set size and concurrently an inclination of the mirror at the mirror fixing segment may become a set angle.

In addition to the aforesaid configuration, the mirror fixing segment is constructed such that a frame part is arranged around a location except its lower part, the inclined wall set to a predetermined angle to fix the mirror is arranged at the rear surface of the segment, the inclination angle of the inclined wall can be maintained to change a size of the frame part, and the changing of the size of the frame part is carried out at at least both frame parts and a width of the frame part can be optionally changed by replacing the insert die in the injection molding means.

The screen fixing segment and the mirror fixing segment constituting the rear projector cabinet are formed by plastic material in such a way that the depth size and the inclination angle of the mirror may become each of the set values, an appropriate wellfocused screen can be obtained by a mere combination of these segments, and even in the case that the screen at the screen fixing segment is different in size, this cabinet can compensate for that different screen size by applying a proper insert die when the mirror fixing segment is molded.

DESCRIPTION OF THE PREFERRED EMBODIMENTS

Figure 1:
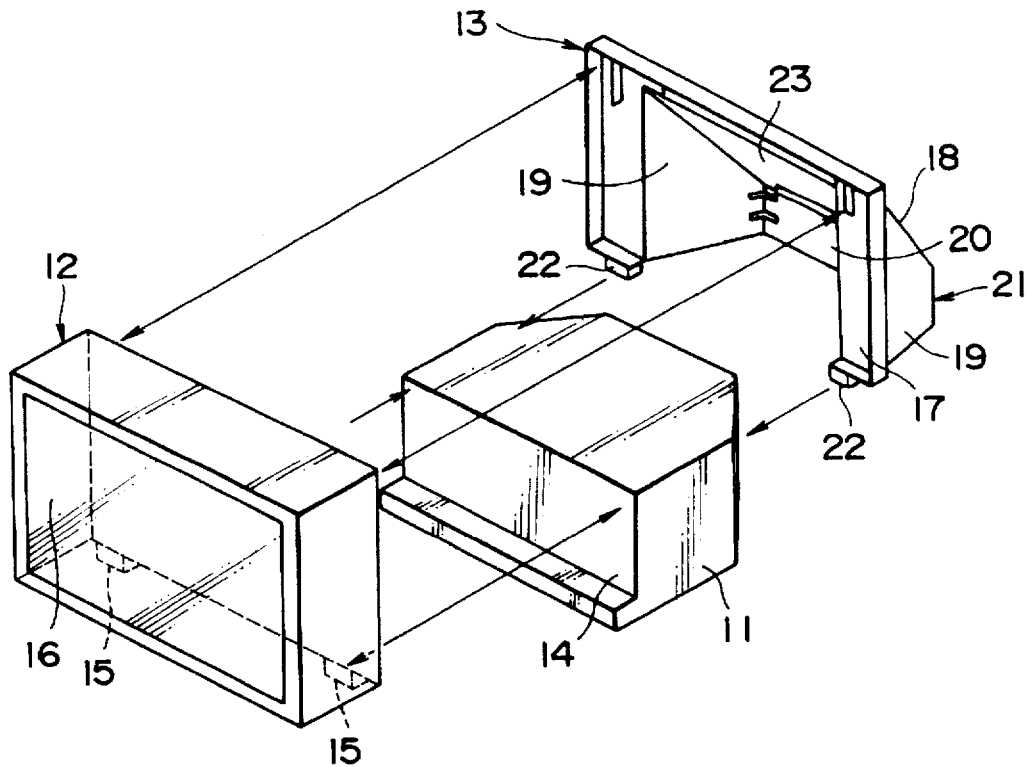
FIG. 1 is a perspective view showing a substantial part with the rear projector of one embodiment of the present invention being disassembled.

Referring now to the drawings, the present invention will be described in detail in reference to the illustrated embodiments. In FIG. 1, a case of the rear projector is comprised of a bottom cabinet 11, a screen fixing segment 12 and a mirror fixing segment 13.

The bottom cabinet 11 has a fixing segment 14 for an operation panel or the like at its front surface side, wherein its rear surface side is projected and formed in a substantial trapezoid and its entire shape is formed to have such a shape as one showing a box-like shape (a modified hexagonal shape as viewed in its top plan view in the illustrated embodiment), visual devices and various kinds of electronic parts required for a driving operation are stored in the cabinet and most of its upper part is opened.

The screen fixing segment 12 is made of plastic material by an injection molding means, and entirely it is formed into a frame shape of either a rectangular shape or a square shape having a certain depth. Each to connecting tongue pieces 15 is projected at a lower edge of an opening part of the rear surface and projected at corners of both sides and integrally formed with it, and a screen 16 is fixed to the front surface side.

The mirror fixing segment 13 is also similarly formed by plastic materials with the injection molding means, wherein its front surface is formed as the frame part 17 having such a size as one substantially corresponding to the rear surface side of the screen fixing segment 12 and the lower end edge of the frame 17 is released open.

A protruded part 21 having a substantially trapezoid shape is formed at the rear surface of the frame 17 by an inclination wall 18 inclined by a predetermined angle from the upper edge of the frame 17 toward the rear surface, both side walls 19 extending from both side edges toward the rear surface side, and a rear surface wall 20 integrally formed with the inclined wall 18 and both side walls 19. Then, a lower part of the protruded part 21 is entirely released along the released open lower end of the frame 17.

Connecting parts 22 are formed at the lower ends of the frame 17 positioned at both sides in correspondence with the connecting tongue pieces 15 arranged at the screen fixing segment. Then, a mirror 23 having a predetermined size is fixed to the mirror fixing segment 13 formed in this way through a predetermined means inside the inclined wall 18.

Figure 2:
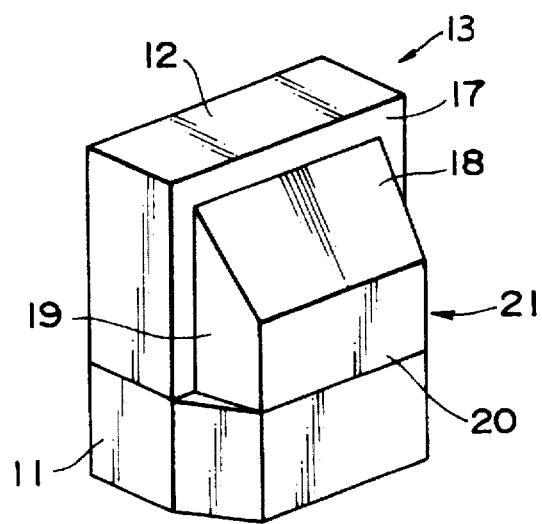
FIG. 2 is a perspective view showing a rear side of the rear projector of the embodiment of the present invention.

As shown in FIG. 2, the mirror fixing segment 13 formed in this way is coupled to the rear surface of the screen fixing segment 12 and fixed to the upper part of the bottom cabinet 11 together with the screen fixing segment 12. In this case, the screen fixing segment 12 and the mirror fixing segment 13 are formed in such a way that their sizes are quite accurate in view of constituting an optical path in relation to the visual devices stored in or arranged in the bottom cabinet 11.

That is, they are formed in such a way that an image reflected at the mirror 23 under a state in which the screen fixing segment 12 and the mirror fixing segment 13 are coupled to each other is formed on the screen 16 in a well-focused state, a distance up to the visual devices and an inclination angle of the mirror 23 and the like are calculated so that the screen may not be curved or deformed and a depth size of the screen fixing segment 12 and an inclination angle of the inclined wall 18 at the mirror fixing segment 13 or the like are accurately set.

In addition, the screen fixing segment 12 and the mirror fixing segment 13 can be increased in their strength partially or entirely, in view of a strength of the case, for example, by applying a partial thick wall at the part requiring a certain strength, or forming a rib, a step or a groove or applying a curved surface (R) at a location where it may easily be broken, resulting in that it is possible to obtain an advantage from the strengthened structure of the plastic case.

Further, another advantage of the plastic case structure consists in the fact that a molding die for the major composing part can be commonly used for the rear projector having a different screen size.

Figure 3:
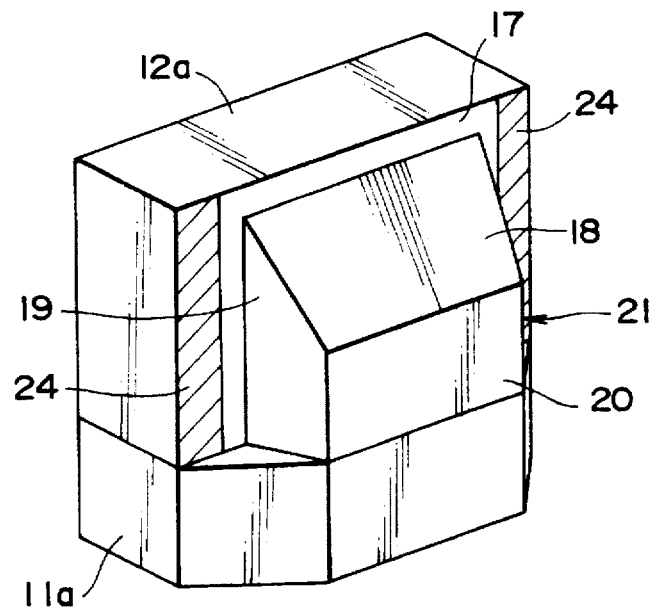
FIG. 3 is a perspective view showing a rear side of the rear projector of the embodiment of the present invention in the case that a different screen size is applied.

In other words, in the case that the wide screen is applied without changing the depth in relation to the screen fixing segment 12 and the mirror fixing segment 13 as shown in FIG. 3, the screen fixing segment 12a becomes automatically wide and then the screen fixing segment does not coincide with the mirror fixing segment 13 in a lateral direction.

In this case, since both portions 24 indicated by slant lines at both sides of the mirror fixing segment 13 are released, other members must be fixed to both portions to cover them, resulting in surplus components that are correspondingly required not only to cause a troublesome assembling operation to be required but also to cause its outer appearance as a commodity to be deteriorated.

The mirror fixing segment 13 is formed in an optical accurate size in relation with the visual devices arranged within the bottom cabinet 11a, so that the mirror fixing segment can be applied to the wide screen while keeping its size accuracy. In this case, since the screen fixing segment 12a is set wide, the bottom cabinet 11a is also correspondingly formed wide in a lateral direction.

Figure 4:
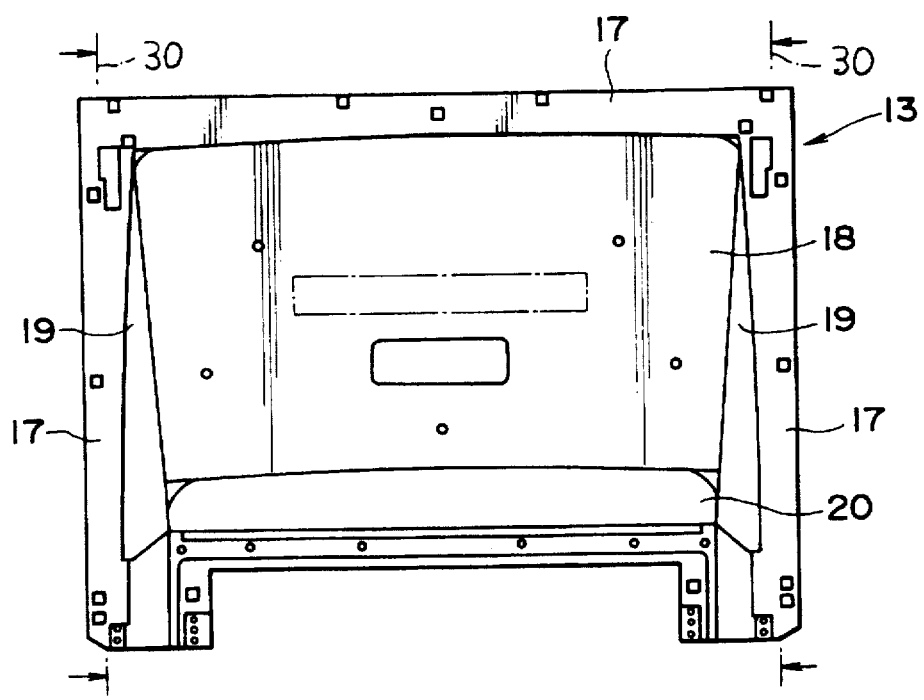
FIG. 4 is a front elevational view showing a case of a mirror fixing part used in the embodiment of the present invention.

The mirror fixing segment 13 of the aforesaid preferred embodiment is molded by the die with the injection molding means and formed as shown in FIG. 4. At this mirror fixing segment 13, it is necessary to expand both frames 17 so as to supplement the portions 24 indicated by slant lines in FIG. 3. In order to expand it, although the die must be machined, at first an alignment state with the screen fixing segment 12a must be considered.

Then, a cavity for use in forming an outside part from the portions indicated by imaginary lines 30 is formed in the insert die except the common portions in both side frames 17 at the mirror fixing segment 13, so that the insert die can be replaced in respect to the molding die.

Figure 5:
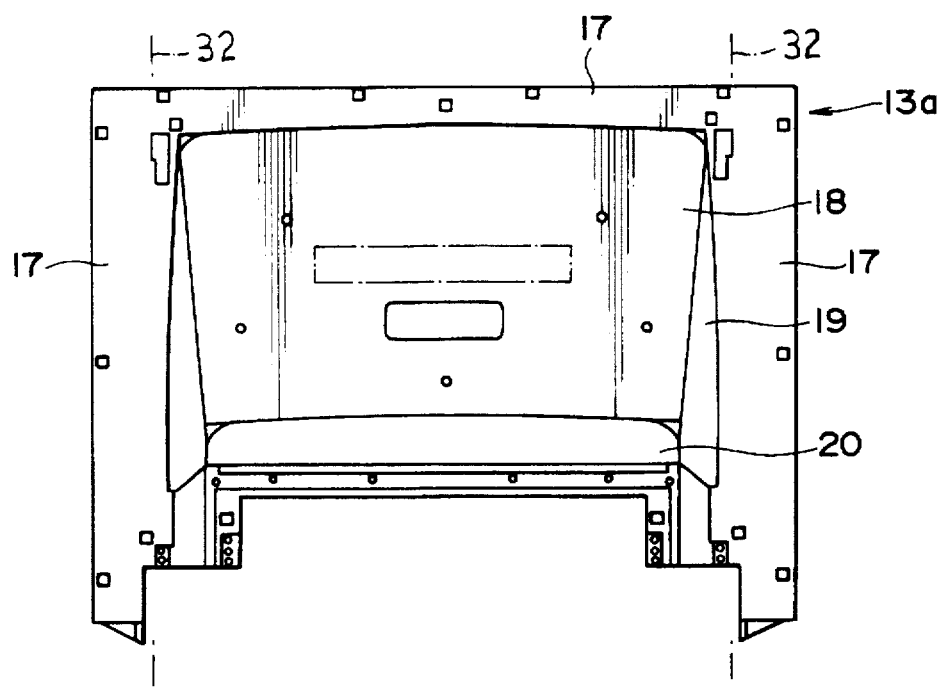
FIG. 5 is a front elevational view showing a case of a mirror fixing part used in the embodiment of the present invention when a different screen size is applied.

Accordingly, the mirror fixing segment 13a shown in FIG. 5 is correspondingly aligned with the wide screen, wherein a cavity forming an outside area from the portions indicated by imaginary lines 32 except the common portions of both side frames 17, so that and the insert die can be replaced in respect to the molding die in the same manner as above.

Figure 6:
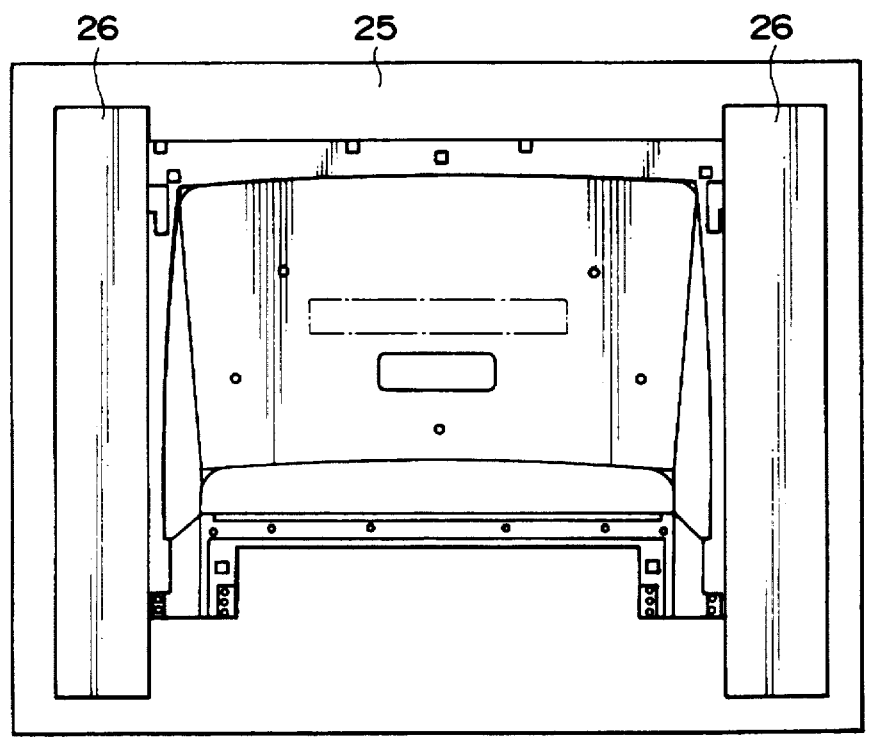
FIG. 6 is a front elevational view showing schematically a part of a die for use in forming the mirror fixing part used in the embodiment of the present invention.

At the molding die 25 schematically shown in FIG. 6, for example, insert die storing portions 26 having predetermined scale and size are formed at portions of the cavity forming the frames 17 at both sides of the mirror fixing segment 13. The predetermined insert dies corresponding to the insert die storing portions 26 can be selected, set and replaced, so that it becomes possible to form a plurality of mirror fixing segments having the same configuration at the major part and only differing in size of the frame portions 17. They can then accommodate the plurality of screen fixing segments 12 and 12a and be accurate in size. In this case, the die 25 is a female die, for example.

Figure 7:
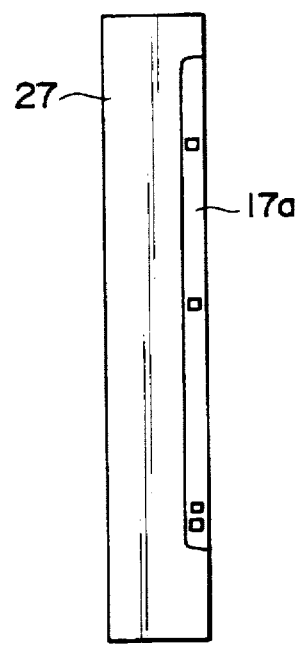
FIG. 7 is a front elevational view showing an insert die of one example used in the die.
Figure 8:
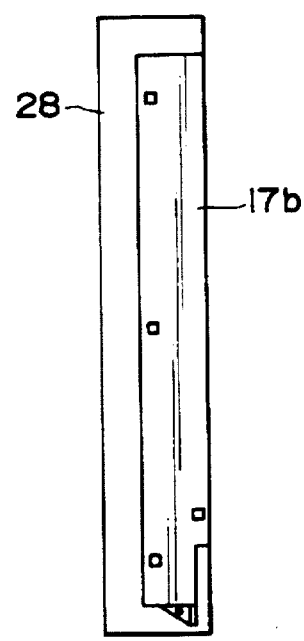
FIG. 8 is a front elevational view showing an insert die of another example used in the die.
Figure 9:
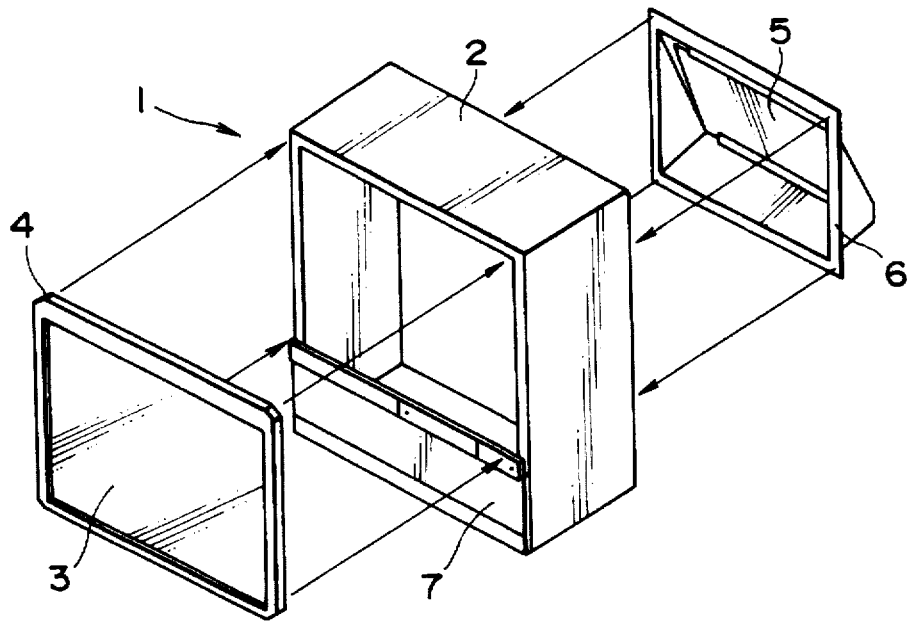
FIG. 9 is a perspective view showing one example of the disassembled rear projector in the prior art.
Figure 10:
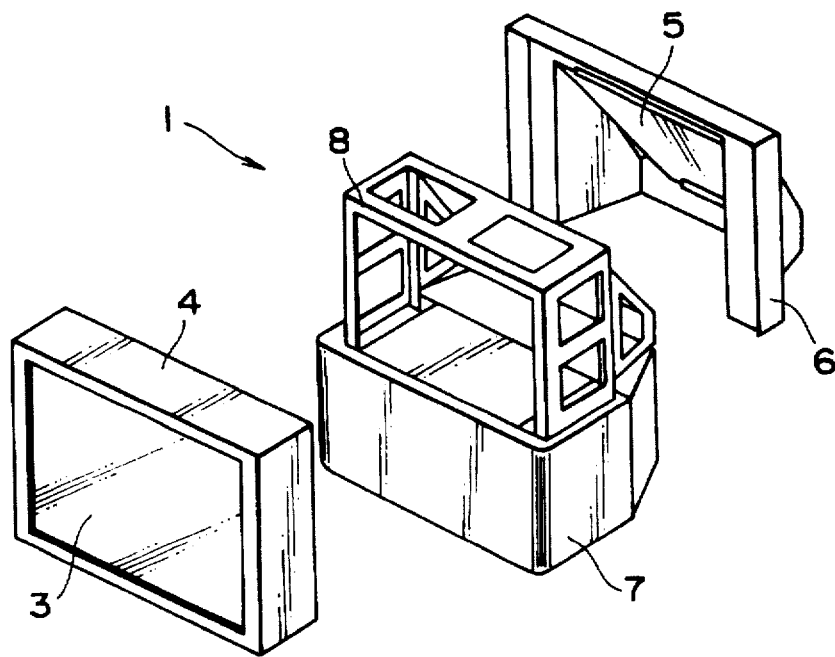
FIG. 10 is a perspective view showing another example of the disassembled rear projector in the prior art.

As the insert die used in this case, it is possible to apply two kinds of insert dies shown in FIGS. 7 and 8, for example. The insert die 27 shown in FIG. 7 has a cavity 17a constituting a part of the frame part 17. When the insert die 27 is set in the insert die storing part 26 of the molding die 25 so as to mold a product with the injection molding means, the mirror fixing segment 13 shown in FIG. 4 can be obtained.

An insert die 28 shown in FIG. 8 has a relative wide cavity 17b constituting a part of the frame part 17. When the insert dies are set within the insert die storing portions 26 of the molding die 25 in the same manner as above to mold a product with the injection molding means, the mirror fixing part 13a shown in FIG. 5 can be obtained.

Although only one of the aforesaid insert dies 27 and 28 is illustrated, it is apparent that symmetrical-shaped insert dies which can be set at both sides of the molding die 25 are prepared and it is also apparent that the corresponding insert dies can be set at male molding dies corresponding to these insert dies 27 and 28 in such a way that they may be replaced, respectively. If, in addition to the aforesaid two kinds of insert dies, a plurality of insert dies having cavities of different sizes and shapes are prepared, plastic cases corresponding to many kinds of rear projectors can be molded.

As described above, in the case that the mirror fixing segment constituting the plastic case is molded, the molding die can be commonly used as a die for molding a plurality of kinds of mirror fixing segments by properly replacing of the major composing part, i.e. the insert die except the inclined wall 18 having a set angle to which the mirror is fixed.

As described above, the cavity in the rear projector of the present invention is comprised of a bottom cabinet having at least such a predetermined shape and a predetermined size as one for installing visual devices; a screen fixing segment with a screen fixed thereto at the front surface of the cabinet; and a mirror fixing segment having a mirror fixed while being inclined at an inner side of the rear surface, wherein the rear surface side of the screen fixing segment and the front surface side of the mirror fixing segment are combined to each other, assembled on the bottom cabinet, the screen fixing segment and the mirror fixing segment are formed by plastic material with an injection molding means in such a manner that a depth size of the assembled segments after being assembled may become a set size and concurrently an inclination of the mirror at the mirror fixing segment may become a set angle, thereby the present invention may provide various superior effects of making a remarkable improvement in accuracy in size of the optical path, can provide a light weight of the entire cabinet due to no requirement for a metallic frame as found in the prior art, reduce the number of component parts, facilitate a monitoring work for the parts and provide an easy assembling operation.

In addition to the aforesaid configuration, the mirror fixing segment is constructed such that a frame part is arranged around a location except its lower part, the inclined wall set to a predetermined angle to fix the mirror is arranged at the rear surface of the segment, the inclination angle of the inclined wall can be maintained to change a size of the frame part, and the changing of the size of the frame part is carried out at at least both frame parts, and a width of the frame part can be optionally changed by replacing the insert die in the injection molding means, thereby the present invention provides superior effects that the size of the mirror fixing segment can be changed at once in correspondence with the screen size of the rear projector and the molding die for use in molding the mirror fixing segment can be commonly used for a plurality of models.

What is claimed is:

1. An improved rear projector cabinet of a kind having a bottom cabinet with a predetermined shape and a predetermined size for installing visual devices therein;

a screen fixing segment with a screen fixed thereto arranged at an upper front surface of the bottom cabinet;

a mirror fixing segment having a mirror fixed therein and being inclined at an inner side of a rear surface thereof; and having an improvement in which:

a rear surface side of the screen fixing segment and a front surface side of the mirror fixing segment are attached to each other and assembled on the bottom cabinet, and the screen fixing segment and the mirror fixing segment are formed by injection molding of a plastic material to have one of at least two selected widths, wherein a depth of the assembled segments is a constant depth independent of the selected width and an inclination of the mirror in the mirror fixing segment is at a constant angle independent of the selected width.

2. The improved rear projector cabinet as set forth in claim 1, having a further improvement in which the mirror fixing segment includes a peripheral frame part having side frame portions and being open at a lower part thereof, said side frame portions of said frame part changing in width corresponding to the selected width of said mirror fixing segment, and an inclined wall is set to a predetermined angle to fix the mirror and is arranged at the rear surface of the mirror fixing segment, so that an inclination angle of the inclined wall is maintained constant independent of the selected width of the side frame portions.

3. An improved method for making a rear projector cabinet of a kind having a bottom cabinet with a predetermined shape and size for installing visual devices therein, a screen fixing segment arranged at an upper front portion of the bottom cabinet, and a mirror fixing segment arranged at an upper rear portion of the bottom cabinet and having a mirror fixed therein and inclined at an inner side of a rear surface thereof, an improvement comprising steps of:

forming the screen fixing segment by injection molding a plastic material;

forming the mirror fixing segment by injection molding a plastic material, so as to have one of at least two selected widths;

assembling the screen fixing segment with the mirror fixing segment, whereby a depth of the assembled segments from a front of the cabinet is a constant depth independent of the selected width and having a further improvement in which the width of said mirror fixing segment can be changed by replacing an insert die during the step of forming the mirror fixing segment by injection molding.

* * * * *